(12) United States Patent
Matsumoto (10) Patent No.: US 8,920,744 B2
(45) Date of Patent: Dec. 30, 2014

(54) FOOD STERILIZATION METHOD AND FOOD STERILIZATION APPARATUS

(75) Inventor: Shunichi Matsumoto, Saitama-Ken (JP)

(73) Assignee: CJ Cheiljedang Corporation, Seoul (KR)

( * ) Notice: Subject to any disclaimer, the term of this patent is extended or adjusted under 35 U.S.C. 154(b) by 169 days.

(21) Appl. No.: 12/853,036

(22) Filed: Aug. 9, 2010

(65) Prior Publication Data

US 2011/0081470 A1    Apr. 7, 2011

(30) Foreign Application Priority Data

Oct. 7, 2009    (JP) ................ 2009-233224

(51) Int. Cl.
    *A61L 2/00*      (2006.01)
    *A23L 1/00*      (2006.01)
    *A23L 3/16*      (2006.01)
    *A23L 3/18*      (2006.01)

(52) U.S. Cl.
    CPC ................ *A23L 3/185* (2013.01)
    USPC ............ 422/296; 426/511; 426/521

(58) Field of Classification Search
    USPC ................. 422/296; 426/511, 521
    See application file for complete search history.

(56) References Cited

U.S. PATENT DOCUMENTS 1,773,081 A    8/1930    Birdseye
3,051,289 A    8/1962    Horsford (Continued)

FOREIGN PATENT DOCUMENTS

CN    1781614    6/2006
CN    101125210    2/2008

(Continued)

OTHER PUBLICATIONS

English Translation of Foreign Document No. 101125210 provided by the State Intellectual Property Office of the P.R.C.: Sterilization Device of Articles; Feb. 20, 2008.*

(Continued)

*Primary Examiner* — Kevin Joyner
(74) *Attorney, Agent, or Firm* — Swanson & Bratschun, L.L.C.

(57) ABSTRACT

Disclosed is a food sterilization method capable of heat-sterilizing foods uniformly by heating steam irrespectively with a shape of an apparatus. The food sterilization method includes introducing the food into the inside of the heat-sterilizing chamber through the opening of the opening and closing part; discharging the air in the inside of the heat-sterilizing chamber through the air discharging part, close contacting the sealing cover and the heat-sterilizing chamber by absorption force of the air to seal the inside of the heat-sterilizing chamber, and then reducing a pressure in the inside of the heat-sterilizing chamber; closing the air discharging part, supplying the steam from the steam supplying part to the inside of the heat-sterilizing chamber to close contact the sealing cover and the opening of the opening and closing part by a pressure of the steam and thereby seal the opening and closing part and the inside of the heat-sterilizing chamber, and then heat-sterilizing the food introduced into the inside of the heat-sterilizing chamber by the steam supplied from the steam supplying part and at the same time, discharging some of the steam in the inside of the heat-sterilizing chamber through the steam discharging part during the heat-sterilization; closing the steam supplying part, and discharging the steam in the inside of the heat-sterilizing chamber through the steam discharging part; and taking the food out of the heat-sterilizing chamber through the opening of the opening and closing part.

7 Claims, 4 Drawing Sheets

(56) References Cited

U.S. PATENT DOCUMENTS

| | | | |
|---|---|---|---|
| 3,069,273 | A | 12/1962 | Wayne |
| 3,290,856 | A | 12/1966 | Rumberger |
| 3,369,479 | A | 2/1968 | Oppenheimer |
| 3,576,249 | A | 4/1971 | Grissinger |
| 4,002,773 | A | 1/1977 | Entenmann |
| 4,034,119 | A | 7/1977 | Kanbe |
| 4,329,829 | A | 5/1982 | Torterotot |
| 4,661,325 | A | 4/1987 | Noro |
| 4,986,432 | A | 1/1991 | Anghileri |
| 5,277,920 | A | 1/1994 | Weaver |
| 5,526,736 | A | 6/1996 | Buriani |
| 5,707,672 | A | 1/1998 | Taguchi et al. |
| 6,319,479 | B1 * | 11/2001 | Houston ................ 422/292 |
| 7,004,346 | B2 | 2/2006 | Schwab |
| 7,314,645 | B2 | 1/2008 | Lee et al. |
| 2007/0108089 | A1 | 5/2007 | Galluch |
| 2008/0152557 | A1 | 6/2008 | Yamaguchi |
| 2010/0247388 | A1 * | 9/2010 | Buczynski et al. ........ 422/112 |
| 2011/0281004 | A1 | 11/2011 | Matsumoto |

FOREIGN PATENT DOCUMENTS

| | | |
|---|---|---|
| CN | 101309623 | 11/2008 |
| JP | H10-099061 | 4/1988 |
| JP | 06-277018 | 4/1994 |
| JP | 08-070833 | 3/1996 |
| JP | H10-339535 A | 12/1998 |
| JP | 2000-238728 A | 9/2000 |
| JP | 2002-142693 | 5/2002 |
| JP | 2004-283084 | 10/2004 |
| JP | 2009-152106 | 7/2009 |
| KR | 10-0196273 | 2/1999 |
| KR | 1020080007191 A | 1/2008 |
| KR | 10-0874332 | 12/2008 |

OTHER PUBLICATIONS

JoeGough "Microwave Indian Curry Meal", "iStock Photo", pub. Feb 24, 2009. http://www.istockphoto.com/stock-photo-8647920-microwave-indian-curry-meal.php.

* cited by examiner

FOOD STERILIZATION METHOD AND FOOD STERILIZATION APPARATUS

CROSS-REFERENCE TO RELATED APPLICATION

This application claims priority from Japanese Patent Application No. 2009-233224 filed on Oct. 7, 2009, in the Japanese Intellectual Property Office, the disclosure of which is incorporated herein by reference in its entirety.

TECHNICAL FIELD

The present invention relates to food sterilization method and apparatus.

BACKGROUND OF THE INVENTION

As a conventional food sterilization apparatus for heat-sterilizing foods, one having a large oven for putting a plurality of foods therein and a locking device for sealing an opening of the oven from the outside is generally employed.

This food sterilization apparatus using a large oven tends to have ununiform temperature distribution in the food received therein. Accordingly, there has been proposed a food sterilization apparatus, which forms a sealed space therein by closely contact an upper chamber and a lower chamber with each other and receives a plurality of foods within this sealed space (see patent document 1: Japanese Patent Application Publication No. H10-99061)

SUMMARY OF THE INVENTION

According to the conventional food sterilization apparatus as described above, it is possible to reduce the ununiformity in the temperature distribution to some extent since the sealed space in a steam chamber is small. However, in the conventional food sterilization apparatus, the steam chamber is formed in a shape of an elongate cylinder in order to receive the foods arranged in a row. Because of this reason, heating steam is not sufficiently supplied to a position at a distance from a steam supply port, and it is thus difficult to heat and sterilize the foods uniformly.

An object of the present invention to solve the above problem is to provide food sterilization method and apparatus for heat-sterilizing foods uniformly by heating steam.

According to a first aspect, there is provided a food sterilization method using a food sterilization apparatus which provided with an opening and closing part having an opening for passing a food therethrough, a heat-sterilizing chamber for heat-sterilizing the food introduced from the opening and closing part, a sealing cover supported movable with respect to the opening of the opening and closing part and the heat-sterilizing chamber, a steam supplying part for supplying steam to the inside of the heat-sterilizing chamber, a steam discharging part for discharging the steam from the inside of the heat-sterilizing chamber after the heat-sterilization of the food, and an air discharging part for discharging air in the inside of the heat-sterilizing chamber, wherein the method comprises: introducing the food into the inside of the heat-sterilizing chamber through the opening of the opening and closing part; discharging the air in the inside of the heat-sterilizing chamber through the air discharging part, close contacting the sealing cover and the heat-sterilizing chamber by absorption force of the air to seal the inside of the heat-sterilizing chamber, and then reducing a pressure in the inside of the heat-sterilizing chamber; closing the air discharging part, supplying the steam from the steam supplying part to the inside of the heat-sterilizing chamber to close contact the sealing cover and the opening of the opening and closing part by a pressure of the steam and thereby seal the opening and closing part and the inside of the heat-sterilizing chamber, and then heat-sterilizing the food introduced into the inside of the heat-sterilizing chamber by the steam supplied from the steam supplying part and at the same time, discharging some of the steam in the inside of the heat-sterilizing chamber through the steam discharging part during the heat-sterilization; closing the steam supplying part, and discharging the steam in the inside of the heat-sterilizing chamber through the steam discharging part; and taking the food out of the heat-sterilizing chamber through the opening of the opening and closing part.

According to a second aspect, there is provided A food sterilization apparatus, comprising: a heat-sterilizing chamber for heat-sterilizing a food; an opening and closing part having first opening and second opening for passing the food therethrough; a steam supplying part for supplying an inside of the heat-sterilizing chamber; a first steam discharging part for discharging the steam from the inside of the heat-sterilizing chamber after the heat-sterilization of the food; a second steam discharging part for discharging some of the steam in the heat-sterilizing chamber during the heat-sterilization of the food; an air discharging part for discharging air in the inside of the heat-sterilizing chamber; and a sealing cover supported movably with respect to the first opening and second opening of the opening and closing part, coming into close contact with the second opening of the opening and closing part by absorption force of the air to make the inside of the heat-sterilizing chamber in a sealed state when the air in the inside of the heat-sterilizing chamber is discharged through the air discharging part and coming into close contact with the first opening of the opening and closing part by a pressure of the steam to make the opening and closing part and the inside of the heat-sterilizing chamber in a sealed state when the steam is supplied from the steam supplying part to the inside of the heat-sterilizing chamber.

According to a third aspect, the heat-sterilizing chamber is made of a generally can shaped sealing container for receiving the food, the opening and closing part is provided with a first opening and closing part having the first opening that is placed one longitudinal end of the sealing container and a second opening and closing part having the second opening that is placed the other one longitudinal end of the sealing container, and the food is introduced into the sealed container through the first opening of the first opening and closing part and is taken out of the sealed container through the second opening of the second opening and closing part.

According to a fourth aspect, the second steam discharging part is placed in lower portions of the first opening and closing part and the second opening and closing part.

According to a fifth aspect, the sealing cover is supported by a support shaft which passes through the opening and closing part so that it can be pivoted and parallelly moved in an inside of the opening and closing part, and one end of the support shaft is coupled with the sealing cover in a position which is eccentric from the center of the sealing cover.

According to a sixth aspect, the apparatus is further provided with a sealing member arranged in a position where the sealing cover and the second opening of the opening and closing part is in close contact with each other.

According to the present invention, it is possible to provide food sterilization method and apparatus capable of heat-sterilizing foods uniformly by heating steam.

BRIEF DESCRIPTION OF THE DRAWINGS

FIGS. 5(a) to 5(d) are views showing food sterilization processes using the food sterilization apparatus.

FIGS. 6(e) to 6(g) are views showing food sterilization processes using the food sterilization apparatus.

1: food sterilization apparatus
2: heat-sterilizing chamber
3: first opening and closing chamber
4: second opening and closing chamber
5: first sealing cover
6: second sealing cover
5a, 6a: support shaft
7, 8 steam supplying part
9: steam discharging part (first steam discharging part)
10: air discharging part
24, 25: sealing rubber
28: first opening
29: second opening
31: first steam removing part (second steam discharging part)
32: second steam removing part (second steam discharging part)
40: retainer
50: food

DESCRIPTION OF EMBODIMENTS

Hereinafter, preferred embodiments of food sterilization method and apparatus according to the present invention will be described with reference to accompanying drawings.

Figure 1:
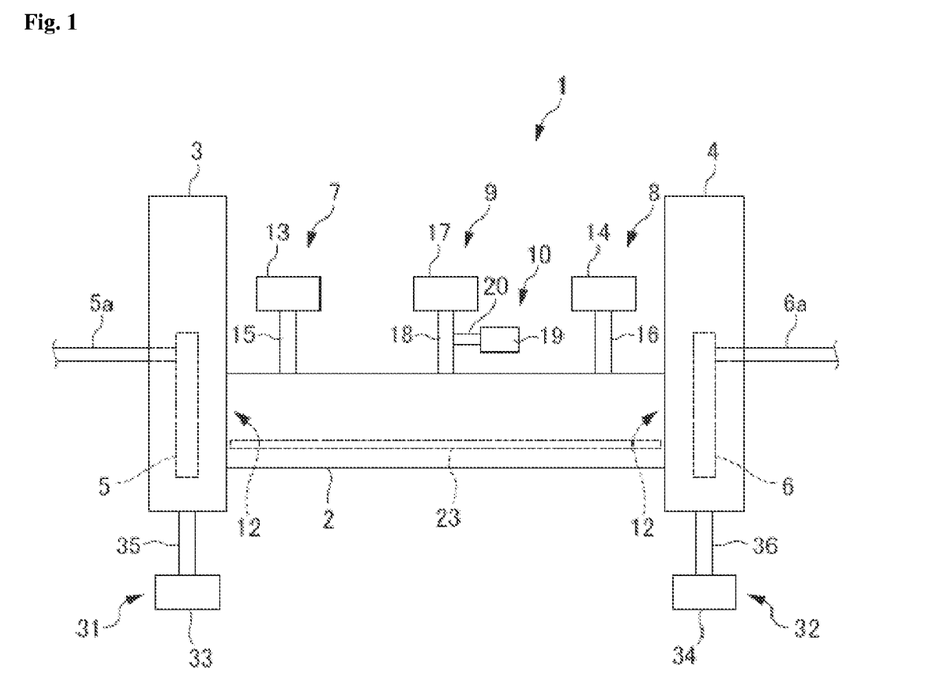
FIG. 1 is an overall structural view of a food sterilization apparatus according to an embodiment of the present invention.

FIG. 1 is an overall structural view of a food sterilization apparatus according to an embodiment of the present invention. The food sterilization apparatus 1 according to an embodiment of the invention includes a heat-sterilizing chamber 2 which functions as a steam chamber, first opening and closing part 3 and second opening and closing part 4 which function as an opening and closing part for passing the foods therethrough, a first sealing cover 5 disposed within the first opening and closing part 3, a second sealing cover 6 disposed within the second opening and closing part 4, steam supplying parts 7,8, a steam discharging part 9 which functions as a first steam discharging part, an air discharging part 10, first steam removing part 31 and second steam removing part 32 which function as a second steam discharging part.

The heat-sterilizing chamber 2 is formed of a cylindrical container having a space therein. The heat-sterilizing chamber 2 has openings 12 at both sides in a longitudinal direction thereof. The openings of the heat-sterilizing chamber 2 are connected with the first opening and closing part 3 and second opening and closing part 4, respectively. In an inside of the heat-sterilizing chamber 2, a plate 23 for placing a retainer 40, which will be described later, thereon is disposed. Also, an outer surface of the heat-sterilizing chamber 2 is provided with the steam supplying parts 7, 8, the steam discharging part 9 and the air discharging part 10.

The steam supplying parts 7, 8 are the device for supplying high temperature, high pressure steam (hereinafter, referred to as heating steam) to the inside of the heat-sterilizing chamber 2. The steam supplying parts 7, 8 are provided with electromagnetic valves 13, 14 for steam supply and communication tubes 15, 16. The steam supplying electromagnetic valves 13, 14 are connected with a steam supplier (not shown) for supplying sterilizing steam to the heat-sterilizing chamber 2. While the steam supplying parts 7, 8 are placed at both ends in a longitudinal direction of the heat-sterilizing chamber 2 in the present embodiment, the positions of the steam supplying parts 7, 8 are not limited thereto and the steam supplying parts 7, 8 may be placed at another positions.

The steam discharging part 9 is the device for discharging the steam supplied to the inside of the heat-sterilizing chamber 2 to the outside after the heat-sterilization of the foods is completed. The steam discharging part 9 is provided with an electromagnetic valve 17 for steam discharge and a communication tube 18. The steam discharging electromagnetic valve 17 is connected with a steam discharging tube (not shown). While the steam discharging part 9 is placed in the middle of the heat-sterilizing chamber 2 in a longitudinal direction thereof in the present embodiment, the positions of the steam discharging part 9 is not limited thereto and the steam discharging part 9 may be placed at another position. Also, while the steam discharging part 9 is placed in the upper portion of the heat-sterilizing chamber 2 in the present embodiment, the steam discharging part 9 is placed in the lower portion.

The air discharging part 10 is the device for discharging air in the inside of the heat-sterilizing chamber 2 to the outside. The air discharging part 10 is provided with an electromagnetic valve 19 for air discharge and a communication tube 20. The air discharging electromagnetic valve 19 is connected with a discharger (not shown) for discharging the air in the inside of the heat-sterilizing chamber 2. While the communication tube 20 of the air discharging part 10 is placed in the middle of the communication tube 18 of the steam discharging part 9 in the present embodiment, the communication tube 20 may be connected directly with the heat-sterilizing chamber 2.

The first steam removing part 31 and second steam removing part 32 are the device for discharging some of the steam from the heat-sterilizing chamber 2 during the heating and sterilization of the foods. The first steam removing part 31 and second steam removing part 32 are provided with electromagnetic valve 33, 34 for steam removal and communication tubes 35, 36, respectively. The electromagnetic valves 33, 34 are connected with a steam removing tube (not shown).

In the present embodiment, the first steam removing part 31 and the second steam removing part 32 are placed at lower portions of the first opening and closing part 3 and the second opening and closing part 4, respectively. However, the positions of the first steam removing part 31 and second steam removing part 32 are not limited thereto. For example, if discharge of drain water which will be described later is not considered, the first steam removing part 31 and second steam removing part 32 may be placed at upper portions of the first opening and closing part 3 and second opening and closing part 4 or an upper portion of the heat-sterilizing chamber 2.

Next, structures of the first opening and closing part 3 and the second opening and closing part 4 will be described. Herein, the structure of the first opening and closing part 3 will be described with reference to FIGS. 2 and 3. Since the structure of the second opening and closing part 4 is the same as the structure of the first opening and closing part 3 except that arrangement of the members of the second opening and closing part 4 is opposite to that of the first opening and closing part 3, description for the first opening and closing part 3 can be referred for the second opening and closing part 4, which will not be described. Also, the reference numerals which are not described will be shown in brackets.

Figure 2:
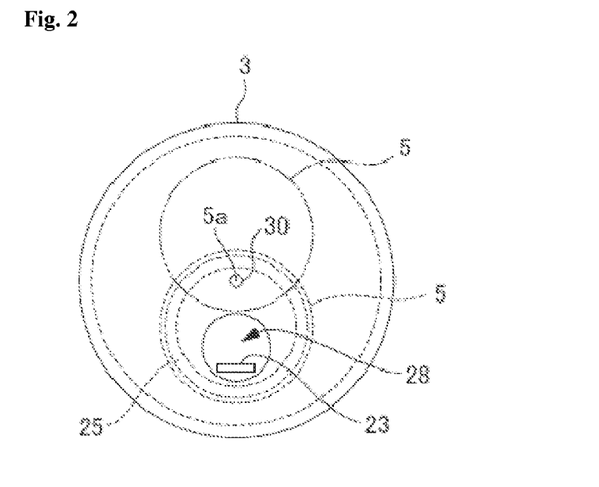
FIG. 2 is a left side view of the food sterilization apparatus.
Figure 3:
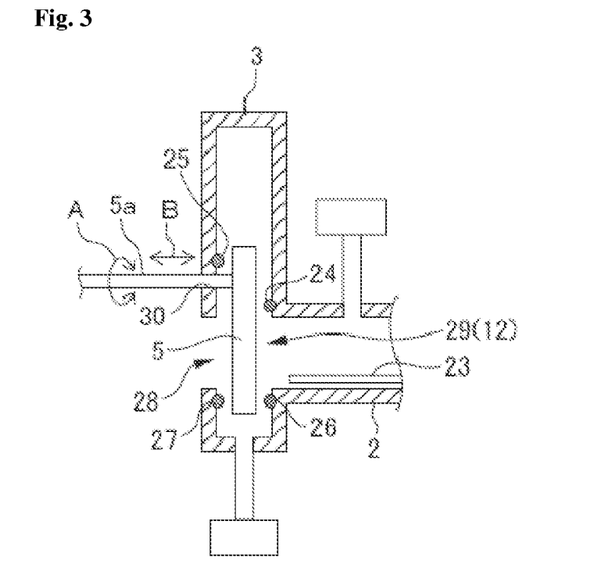
FIG. 3 is a schematic sectional view of a first opening and closing part.

FIG. 2 is a left side view of the food sterilization apparatus. FIG. 3 is a schematic sectional view of a first opening and closing part. The first opening and closing part 3 is provided a first sealing cover 5 in the inside thereof. Also, the first opening and closing part 3 is provided with a first opening 28, a second opening 29 and a through hole 30 for passing a support shaft 5a therethrough. The first opening 28 and the second opening 29 have a size which allows pass of the retainer 40, in which the foods are received, therethrough. Also, the second opening 29 is communicated with the opening 12 of the heat-sterilizing chamber 2.

The first sealing cover 5 is coupled to the support shaft 5 (6a in the second opening and closing part) which passes through the through hole 30 of the first opening and closing part 3. One end of the support shaft 5a is connected with a driving device (not shown). This driving device give a driving force for pivoting the first sealing cover 5 to the support shaft 5a. The support shaft 5a is pivoted in clockwise or counter-clockwise direction as shown by an arrow A in FIG. 3. In FIG. 2, a state (open position) that the first sealing cover 5 is pivoted so as to open the first opening 28 is shown in a to-dot chain line, and a stat (close position) that the first sealing cover 5 is pivoted so as to close the first opening 28 is shown in a broken line. Also, the support shaft 5a is not limited to the structure in that it is pivoted by the driving device, but may be configured so that it is pivoted manually.

Further, sealing rubbers 24, 25 are mounted in the inside of the first opening and closing part 3 as shown in FIG. 3. The sealing rubber 24 is for sealing between the first sealing cover 5 and the second opening 29 when the first sealing cover 5 is inwardly and parallelly moved and comes into close contact with the second opening 29 of the first opening and closing part 3 by an absorption force of the air upon the discharge of the air from the air discharging part 10. The sealing rubber 24 is inserted in a groove 26 formed on an internal wall around the second opening 29 of the first opening and closing part 3. When the first sealing cover 5 and the second opening 29 of the first opening and closing part 3 come into close contact with each other, sealing between the first sealing cover 5 and the second opening 29 is made by the sealing rubber 24 to close the second opening 29 of the first opening and closing part 3. Therefore, the inside of the heat-sterilizing chamber 2 becomes a sealed state as the second opening 29 of the first opening and closing part 3 (and the second opening and closing part 4) is closed.

Meanwhile, the sealing rubber 25 is for sealing between the first sealing cover 5 and the first opening 28 when the first sealing cover 5 is outwardly and parallelly moved and then closely contacted with the first opening 28 of the first opening and closing part 3 by the pressure of the heating steam upon supply of the heating steam from the steam supplying parts 7, 8. The sealing rubber 25 is inserted in a groove 27 formed on an internal wall around the first opening 28 of the first opening and closing part 3. When the first sealing cover 5 and the first opening 28 of the first opening and closing part 3 come into close contact with each other, sealing between the first sealing cover 5 and the first opening 28 is made by the sealing rubber 25 to close the first opening 28 of the first opening and closing part 3. Therefore, the first opening and closing part 3 (and second opening and closing part 4) and the inside of the heat-sterilizing chamber 2 become a sealed state as the first opening 28 of the first opening and closing part 3 (and the second opening and closing part 4) is closed.

Also, while the first opening 28 and the second opening 29 of the first opening and closing part 3 are formed in a circular shape and the sealing rubbers 24, 25 are formed in a ring shape as shown in FIG. 2 in the present embodiment, the first opening 28 and the second opening 29 may have a rectangular shape. In this case the sealing rubbers 24, 25 are formed in a rectangular frame shape.

The support shaft 5a supports the first sealing cover 5 so that the first sealing cover 5 can be parallelly moved as shown by an arrow B in FIG. 3. The first sealing cover 5 is parallelly moved by the absorption force of the air or the pressure of the steam. That is, the first sealing cover 5 is inwardly and parallelly moved in the first opening and closing part 3 and comes into close contact with the side face of the heat-sterilizing chamber 2 by the absorption force of the discharged air when the air is discharged from the air discharging part 10. Therefore, the heat-sterilizing chamber 2 becomes a sealed state as its both sides are closed by the first sealing cover 5 (and the second sealing cover 6) and the sealing rubber 24.

Also, the first sealing cover 5 is outwardly and parallelly moved in the first opening and closing part 3 and comes into close contact with the first opening 28 of the first opening and closing part 3 by the pressure of the steam when the heating steam is supplied from the steam supplying parts 7, 8. Therefore, the first opening and closing part 3 (and the second opening and closing part 4) and the inside of the heat-sterilizing chamber 2 becomes a sealed state as the first opening 28 of the first opening and closing part 3 is closed by the first sealing cover and the sealing rubber 25 (the same for the second opening and closing part 4).

As described above, the second opening and closing part 4 and the second sealing cover 6 shown in FIG. 1 have the same structure as the first opening and closing part 3 and the first sealing cover 5, the second sealing cover 6 of the second opening and closing part 4 is driven at a predetermined timing which is the same as that of the first sealing cover 5 of the first opening and closing part 3.

Figure 4:
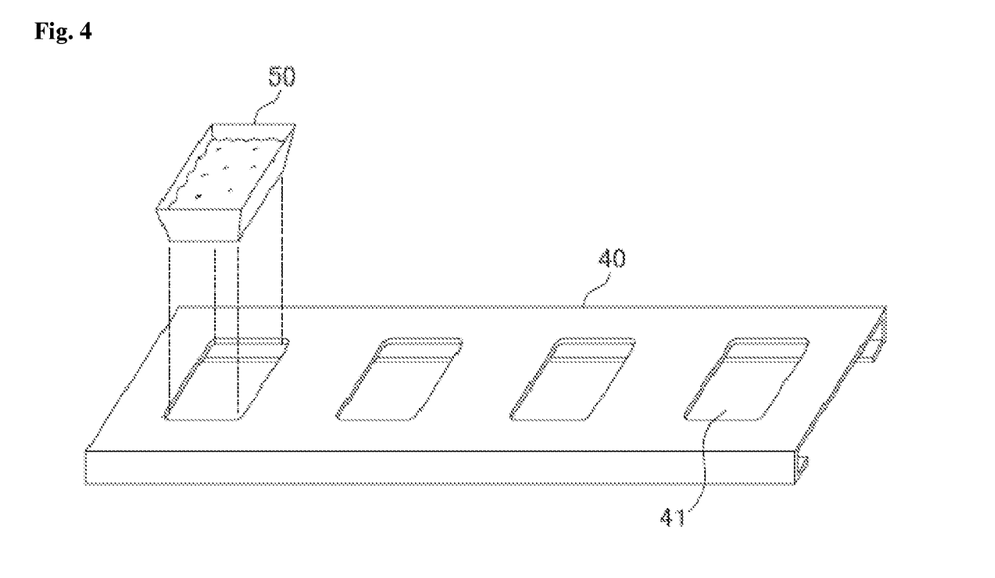
FIG. 4 is a perspective view of exterior of a retainer.
Figure 5:
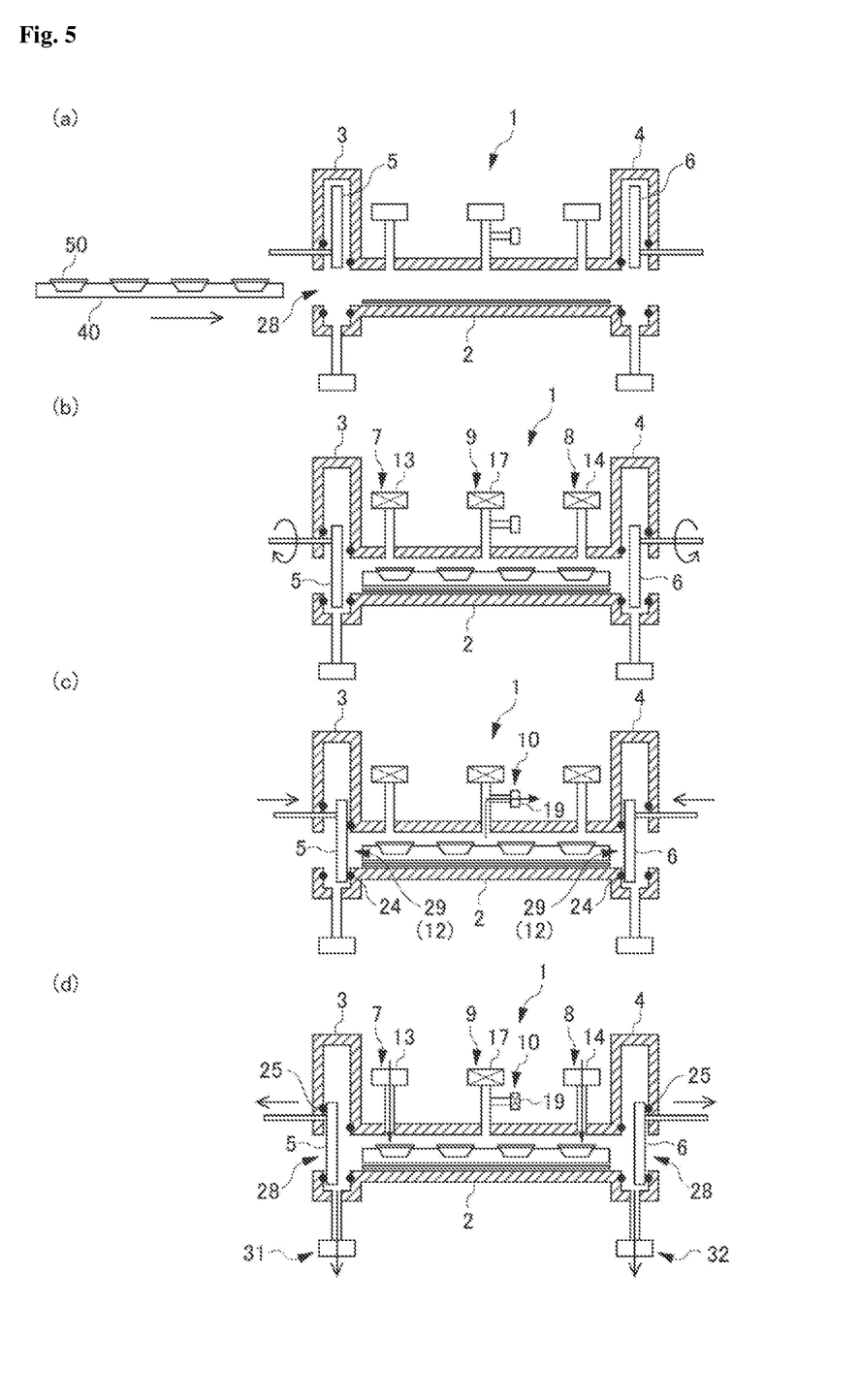
Figure 6:
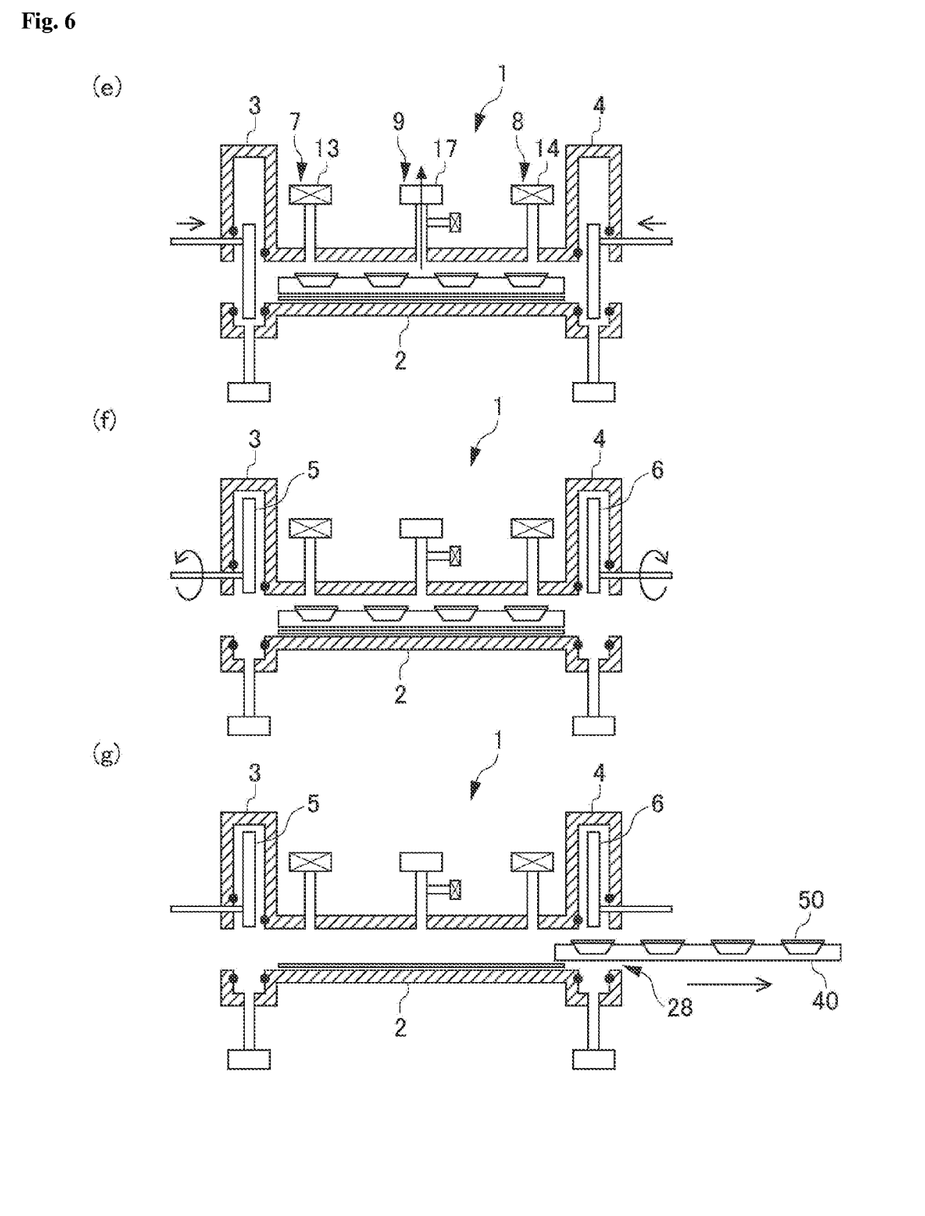

Next, the foods to be heat-sterilized and the retainer will be described. FIG. 4 is a perspective view of exterior of the retainer 40. The retainer is a metal tray having a ⊐-shaped section.

The retainer 40 is formed with a plurality of openings 41 for receiving foods 50. The food 50 is formed of a box shaped plastic container. In this container, rice, soybeans, root vegetables, noodles and the like are filled as the content. In the present embodiment, the state in that the content is filled in the container is referred to as a "food". Also, while four foods 50 are received in a single retainer 40 in a row in FIG. 4, number and arrangement of the received foods 50 may be suitably selected.

In the present embodiment, the retainer 40 which receives the foods 50 is introduced into the inside of the heat-sterilizing chamber 2 through the first opening 28 and the second opening 29 of the first opening and closing part 3. After heat-sterilization which will be described later is implemented, the retainer 40 is taken out of the heat-sterilizing chamber through the first opening 28 and the second opening 29 of the second opening and closing part 4 (not shown) which is opposite to the first opening and closing part 3.

Also, the food sterilization apparatus 1 is provided with an introduction device (not shown) for introducing the retainer 40 continuously into the inside of the heat-sterilizing chamber 2 through the first opening 28 and the second opening 29 of the first opening and closing part 3, and a take-out device (not shown) for taking the retainer 40 continuously out of the heat-sterilizing chamber 2 through the first opening 28 and the second opening 29 of the second opening and closing part 4.

The introduction device and the take-out device can employ various devices provided that they can introduce and take out of the retainer 40 continuously. For example, a belt conveyor type transporting device can be employed or a rod type transporting device can be employed.

Next, a food sterilization method using the food sterilization apparatus 1 structured as described above will be described. FIGS. 5(a) to 5(d) and 6(e) to 6(g) are views showing food sterilization processes using the food sterilization apparatus 1. Also, in FIGS. 5 and 6, the reference numerals are given only to the portion necessary to describe each process. Further, hatching of the section in each part is omitted. Furthermore, an opened electromagnetic valve is indicated by a blank and a closed electromagnetic valve is indicated by an 'X' mark.

In a first process, as shown in FIG. 5(a), the first sealing cover 5 of the first opening and closing part 3 is pivoted to the open position, and the retainer 40 which receives the foods 50 is introduced into the inside of the heat-sterilizing chamber 2 through the first opening 28 and the second opening 29 of the first opening and closing part 3. Also, as shown in FIG. 5(a), the second sealing cover 6 of the second opening and closing part 4 which is an outlet for the retainer 40 is pivoted to the open position, which is the same as the first sealing cover 5 of the first opening and closing part 3. However, upon the introduction of the retainer 40, the second sealing cover 6 of the second opening and closing part 4 may be placed in the close position. Also, the first sealing cover 5 and the second sealing cover 6 are configured so that they can be parallelly moved in this state.

In a second process, as shown in FIG. 5(b), the first sealing cover 5 of the first opening and closing part 3 and the second sealing cover 6 of the second opening and closing part 4 are pivoted to the close position. Also, the steam supplying electromagnetic valves 13, 14 of the steam supplying parts 7, 8 and the steam discharging electromagnetic valve 17 of the steam discharging part 9 are closed.

In a third process, as shown in FIG. 5(c), the air discharging electromagnetic valve 19 of the air discharging part 10 is opened to discharge the internal air of the heat-sterilizing chamber through the air discharging part 10. At this time, by the absorption force of the discharged air, the first sealing cover 5 and the second sealing cover 6 are inwardly and parallelly moved in the first opening and closing part 3 and the second opening and closing part 4 and come into close contact with the second opening 29. Therefore, the opening 12 formed at both sides of the heat-sterilizing chamber 2 are closed by the first sealing cover 5, the second sealing cover 6 and the sealing rubbers 24 and the heat-sterilizing chamber 2 becomes a sealed state. After that, the internal air of the heat-sterilizing chamber 2 is discharged through the air discharging part 10 to reduce the pressure in the inside of the heat-sterilizing chamber 2. Next process is proceeded when the inside of the heat-sterilizing chamber 2 becomes vacuum by this reduction in the pressure.

The reason of making the inside of the heat-sterilizing chamber 2 in vacuum in the third process is because heat transfer becomes ununiform upon supply of the heating steam if air is present on the surface of the food 50. As heat transfer medium such as the air is reduced by making the inside of the heat-sterilizing chamber 2 in vacuum, it is possible to transfer the heat of the heating steam uniformly to the food 50. Also, it is possible to shorten the time required for the heat-sterilization since the heat of the heating steam can be easily transferred to the food 50. Also, it is possible to make the temperature in the inside of the heat-sterilizing chamber 2 high in a short time.

Further, while it is preferred to make the inside of the heat-sterilizing chamber in absolute vacuum, production efficiency is lowered if it takes time to reach the vacuum. Because of this reason, it is preferred to obtain a practical vacuum pressure with seconds of air discharge time in the pressure reduction process. For example, it is possible to obtain sufficient effect with a vacuum pressure of 0.07 to 0.09 MPa. However, though the pressure in the inside of the heat-sterilizing chamber 2 is not reduced to the vacuum pressure as described above, it is possible to obtain corresponding effect by reducing the pressure in the inside of the heat-sterilizing chamber 2 lower than an atmospheric pressure.

In a fourth process, as shown in FIG. 5(d), the air discharging electromagnetic valve 19 of the air discharging part 10 is closed to stop the discharge of the air. Accordingly, the close contact of the first sealing cover 5 and the second sealing cover 6 with the second opening 29 is released and the first sealing cover 5 and the second sealing cover 6 become movable. Subsequently, the steam supplying electromagnetic valves 13, 14 of the steam supplying part 7, 8 are opened to supply the heating steam from the steam supplying part 7, 8 to the inside of the heat-sterilizing chamber 2. Upon the supply of the heating steam, by the pressure of the heating steam, the first sealing cover 5 and the second sealing cover 6 are outwardly and parallelly moved in the first opening and closing part 3 and the second opening and closing part 4 and come into close contact with the first openings 28 of the first opening and closing part 3 and the second opening and closing part 4, respectively. Accordingly, the first openings 28 of the first opening and closing part 3 and the second opening and closing part 4 are closed by the first sealing cover 5, the second sealing cover 6 and the sealing rubbers 25 and the insides of the first opening and closing part 3, the second opening and closing part 4 and the heat-sterilizing chamber 2 become a sealed state.

Also, in the fourth process, not only the heating steam is supplied from the steam supplying parts 7, 8 to the inside of the heat-sterilizing chamber 2, but also the steam removing electromagnetic valves 33, 34 are opened to discharge some of the heating steam in the inside of the heat-sterilizing chamber 2 through the first steam removing part 31 and the second steam removing part 32. For example, when the steam supplying parts 7, 8 supply the heating steam of 3.2 km/m$^2$, the first steam removing part 31 and the second steam removing part 32 discharge the heating steam of 0.2 km/m$^2$ in total. Accordingly, the heating steam is supplied to the inside of the heat-sterilizing chamber 2 always at a pressure of 3.0 km/m$^2$. Further, the steam removing electromagnetic valves 33, 34 of the first steam removing part 31 and the second steam removing part 32 may be always in an open state across entire processes.

As such, in the fourth process, some of the heating steam in the inside of the heat-sterilizing chamber 2 is discharged through the first steam removing part 31 and the second steam removing part 32 while the heating steam is supplied from the steam supplying parts 7, 8 to the inside of the heat-sterilizing chamber 2. With keeping this state, the foods 50 are heat-sterilized for a predetermined time with the heating steam supplied to the inside of the heat-sterilizing chamber 2. When the heat-sterilization is completed, the next process is proceeded.

In a fifth process, as shown in FIG. 6(e), the steam supplying electromagnetic valves 13, 14 of the steam supplying parts 7, 8 are closed to stop the supply of the heating steam. Thereby, the close contact of the first sealing cover 5 and the second sealing cover 6 with the first openings 28 of the first opening and closing part 3 and the second opening and closing part 4 is released and the first sealing cover 5 and the second sealing cover 6 become pivotable. Subsequently, the steam discharging electromagnetic valve 17 of the steam discharging part 9 is opened to discharge the heating steam in the inside of the heat-sterilizing chamber 2 through the steam discharging part 9. When the discharge of the heating steam is completed, the next process is proceeded.

In a sixth process, as shown in FIG. 6(f), the first sealing cover 5 of the first opening and closing part 3 and the second sealing cover 6 of the second opening and closing part 4 are pivoted to the open position.

In a seventh process, as shown in FIG. 6(g), the retainer 40 which receives the heat-sterilized foods 50 is taken out of the heat-sterilizing chamber 2 through the first opening 28 and the second opening 29 of the second opening and closing part 4.

Also, simultaneously with the take-out of the retainer 40 through the first opening 28 and the second opening 29 of the second opening and closing part 4, it is possible to introduce another retainer 40, which receives to the foods 50 be heat-sterilized next, to the inside of the heat-sterilizing chamber 2 through the first opening 28 and the second opening 29 of the second opening and closing part 4. In the food sterilization apparatus 1 of the present embodiment, the retainer 40 is introduced to the inside of the heat-sterilizing chamber 2 through the first opening 28 and the second opening 29 of the first opening and closing part 3, the heat-sterilization is implemented and then the retainer 40 is taken out through the first opening 28 and the second opening 29 of the second opening and closing part 4. According to this configuration, since it is possible to introduce and take out the retainer 40, which receives the foods 50, continuously with respect to the heat-sterilizing chamber 2 as described above, it is possible to raise efficiency of the heat-sterilization.

By repeating the first through seventh processes, it is possible to heat-sterilize the foods 50 received in the retainer 40. Also, in an actual heat-sterilization, a plurality of sterilization processes is generally implemented. For example, in a production line in which rice is the content, the following processes are included:

(a) A plastic container is received in the retainer 40.

(b) The rice which is the content is weighted and filled in the container (hereinafter, called as the food 50).

(c) The retainer 40 is introduced in the inside of the heat-sterilizing chamber 2.

(d) The food 50 is heat-sterilized for a predetermined time (first sterilization). After the first sterilization, the retainer 40 is taken out of the heat-sterilizing chamber 2.

(e) The food 50 is taken out of the retainer 40 and transported to a cooking apparatus which is used in the next process. Also, the retainer 40 of which the food 50 has been taken out is returned again, via a clean tunnel, to the place where the process (a) is implemented.

(f) A predetermined amount of water is filled in the container of the food 50.

(g) The food 50 is heat-sterilized at about 100° C. for 20 to 30 minutes in a steam tub of the coking apparatus (second sterilization). After the second sterilization, the food 50 is taken out of the steam tub of the cooking apparatus and transported to a sealing apparatus which is used in the next process.

(h) The food 50 is covered and sealed by a cover under a clean environment in the sealing apparatus.

(i) Again, the food 50 is heat-sterilized at 70 to 80° C. for 10 to 20 minutes in the steam tub (or hot water) of the coking apparatus (third sterilization).

(j) After the third sterilization, the food 50 is cooled for 10 to 30 minutes by cool water or cool water shower.

(k) After the cooling, the food 50 is transported in a sequence of a dry process, a visual inspection process and package process.

According to the food sterilization apparatus 1 and the food sterilization method using the same, the following effects are obtained.

(1) In the food sterilization apparatus 1 of the present embodiment, some of the heating steam in the inside of the heat-sterilizing chamber 2 is discharged through the first steam removing part 31 and the second steam removing part 32 while the heating steam is supplied from the steam supplying parts 7, 8 to the inside of the heat-sterilizing chamber 2. Thereby, it is possible to form a stream of the heating steam in the inside of the heat-sterilizing chamber 2 by supplying the heating steam to the heat-sterilizing chamber 2. Thus, it is possible to spread the heating steam to everywhere of the heat-sterilizing chamber 2 as compared to the case in that the inside of the heat-sterilizing chamber 2 is sealed. Therefore, it is possible to uniformly heat-sterilize every foods 50 received in the retainer 40 even when the heat-sterilizing chamber 2 has an elongate can shape.

(2) In the food sterilization apparatus 1 of the present embodiment, the first steam removing part 31 and the second steam removing part 32 are placed at lower portions of the first opening and closing part 3 and the second opening and closing part 4. Thereby, even when some of the heating steam supplied to the heat-sterilizing chamber 2 is condensed and transformed to water, this water can be discharged as drain water through the first steam removing part 31 and the second steam removing part 32. Accordingly, since it is unnecessary to remove the drain water from the first opening and closing part 3 and the second opening and closing part 4, it is possible to implement the heat-sterilization continuously without periodically stopping operation of the apparatus. Therefore, it is possible to enhance working efficiency. Also, it is possible to reduce a number of maintenance of the apparatus.

Also, when the drain water is discharged at once after the drain water is gathered in the inside of the heat-sterilizing chamber 2, rapid temperature change occurs in the inside of the heat-sterilizing chamber 2. However, when the drain water is discharged slowly through the first steam removing part 31 and the second steam removing part 32 during the heat-sterilization as is in the present embodiment, it is possible to implement the heat-sterilization in a stable temperature state since the rapid temperature change does not easily occur in the inside of the heat-sterilizing chamber 2.

(3) In the food sterilization apparatus 1 of the present embodiment, the heat transfer medium such as the air is reduced by making the inside of the heat-sterilizing chamber 2 in vacuum prior to the heat-sterilization by the heating steam. Thus, it is possible to transfer heat of the heating steam uniformly to the food 50 upon the heat-sterilization. Also, it is possible to shorten the time required for the heat-sterilization since the heat of the heating steam can be easily transferred to the food 50. Also, it is possible to make the temperature in the inside of the heat-sterilizing chamber 2 high in a short time.

(4) In the food sterilization apparatus 1 of the present embodiment, the heat-sterilizing chamber 2 can be sealed by the absorption force of the air when making the inside of the heat-sterilizing chamber 2 in vacuum. Also, the first opening and closing part 3, the second opening and closing part 4 and the heat-sterilizing chamber 2 can be sealed by the pressure of the heating steam when heat-sterilizing the food 50 in the inside of the heat-sterilizing chamber 2. Thereby, since it is an outer locking device for forming a sealed space is unnecessary, it is possible to form a sealed space without enlargement of the apparatus and using of an outer locking device.

(5) In a conventional apparatus having an outer locking device and a driving device for the outer locking device, it is required to lock a cover of a sealed container so that the cover is not opened by an internal pressure of the container. Also, it is required to release the lock of the cover after the sterilization treatment. Therefore, the conventional apparatus requires a working time for locking or releasing the cover. However, in the food sterilization apparatus 1 of the present embodiment, it is possible to make the heat-sterilizing chamber 2 in sealed state only by air discharge or steam supply. Also, it is possible to release the sealed state of the heat-sterilizing chamber 2 only by stopping the air discharge or the steam supply. Therefore, it is possible to shorten the working time since the process for locking or releasing the cover becomes unnecessary.

(6) The first sealing cover 5 and the second sealing cover 6 do not require an external driving force for their parallel movement but only require an external driving force for their pivot, and thus it is possible to simplify the configuration of the apparatus.

(7) In the food sterilization apparatus 1 of the present embodiment, retainer 40 is introduced to the inside of the heat-sterilizing chamber 2 through the first opening 28 and the second opening 29 of the first opening and closing part 3, the heat-sterilization is implemented and then the retainer 40 is taken out through the first opening 28 and the second opening 29 of the second opening and closing part 4 which is opposite to the first opening and closing part 3. According to this configuration, it is possible to introduce and take out the retainer 40, which receives the foods 50, continuously in one way with respect to the heat-sterilizing chamber 2. Therefore, it is possible to easily automate the introduction/take-out of the retainer 40 by an introduction/take-out using a belt conveyer or the like.

(8) In the food sterilization apparatus 1 of the present embodiment, the first sealing cover 5 and the second sealing cover 6 are supported by the support shafts 5a, 6a so that they can be pivoted and parallelly moved, and at the same time, one end of the support shafts 5a, 6a is coupled with the first sealing cover 5 and the second sealing cover 6 in a position which is eccentric from the center of the first sealing cover 5 and the second sealing cover. According to this configuration, it is possible to easily open and close the first opening 28 of the first opening and closing part 3 and the second opening and closing part 4. Also, since only the support shafts 5a, 6a pass through the first opening and closing part 3 and the second opening and closing part 4, it is possible to minimize the opening portion that lowers the sealing property.

(9) In the food sterilization apparatus 1 of the present embodiment, the sealing rubber 24 is provided as a sealing member in a position where the first sealing cover 5 and the second sealing cover 6 come into close contact with the second opening 29 of the first opening and closing part 3 and the second opening and closing part 4. According to this configuration, it is possible to raise the sealing property when the first sealing cover 5 and the second sealing cover 6 are in close contact with the second opening 29. Also, in the food sterilization apparatus 1 of the present embodiment, the sealing rubber 25 is provided as a sealing member in a position where the first sealing cover 5 and the second sealing cover 6 come into close contact with the first opening 28 of the first opening and closing part 3 and the second opening and closing part 4. According to this configuration, it is possible to raise the sealing property when the first sealing cover 5 and the second sealing cover 6 are in close contact with the first opening 28.

Furthermore, the food sterilization method and food sterilization apparatus can be modified, substituted and added with elements variously described as follows, from the above described embodiment, and these modification, substitution and addition do not depart from the spirit and scope of the present invention.

(1) While the heating steam is supplied continuously to the heat-sterilizing chamber 2 upon the heat-sterilization (fourth process) in the present embodiment, it is possible to supply the heating steam intermittently. That is, the third process (pressure reduction), the fourth process (supply) and the fifth process (discharge) are repeated a predetermined times as a single cycle.

When the reduction in pressure in the inside of the heat-sterilizing chamber 2, supply of the heating steam and discharge of the heating steam are implemented repetitively as described above, it is possible to raise the temperature from about 100° C. to about 140° C. in a relatively short time of 1.0 to 1.5 seconds. Also, it is possible to discharge the heating steam in a relatively short time.

By implementing the heat-sterilization with the aforementioned method, it is possible to raise the temperature in the inside of the heat-sterilizing chamber 2 to the temperature required for the sterilization in a short time. Also, it is possible to lower the temperature to the original temperature. Thus, it is possible to reduce the time taken for the sterilization notably. Further, it is possible to enhance productivity by automating previous and next processes thereof.

(2) The heat-sterilizing chamber 2 may have a shape other than an elongate can as is in the present embodiment. For example, the heat-sterilizing chamber 2 may employ a shape of a prism, an elliptic cylinder or a semicircular cylinder. Also, the height, width and overall length of the heat-sterilizing chamber 2 may be set suitably according to size and number of the foods to be heat-sterilized. For example, it is possible to introduce/take out two rows of the retainer at the same time. Also, it is possible to arrange a plurality of the food sterilization apparatuses 1 parallel. In this case, the same processes may be implemented at the same time or with a predetermined time gap.

(3) It may be possible that both sealing rubbers 25, 25 which function as a sealing member are not provided. In this case, it is possible to minimize leakage of the steam by raising smoothness of faces where the first sealing cover 5 and the second sealing cover 6 are in contact with the first opening 28 (periphery of the opening), or the first sealing cover 5 and the second sealing cover 6 are in contact with the second opening 29 (periphery of the opening). Further, though it is preferred that the structure of the sealing rubbers in the first opening and closing part 3 and the second opening and closing part 4 are the same, they may have different structures. Furthermore, other than the sealing rubber, for example, a sealing member made of a heat resistant resin may be employed.

(4) The food sterilization apparatus 1 of the present embodiment is provided with the steam discharging part 9 as a first steam discharging part and the first steam removing part 31 and the second steam removing part 32 as a second steam discharging part. However, it is possible that the food sterilization apparatus is not provided with the first steam removing part 31 and the second steam removing part 32, but is provided only with the steam discharging part 9. In this case, some of the heating steam in the inside of the heat-sterilizing chamber 2 is discharged from the steam discharging part 9 by opening the steam discharging electromagnetic valve 17 simultaneously with the supply of the heating steam from the steam supplying parts 7, 8 to the inside of the heat-sterilizing chamber 2 in the fourth process.

What is claimed is:

1. A food sterilization apparatus, comprising:
a heat-sterilizing chamber for heat-sterilizing a food;
an opening and closing part having a first opening and a second opening for passing the food there through;
a steam supplying part for supplying steam inside of the heat-sterilizing chamber;
a first steam discharging part for discharging the steam from the inside of the heat-sterilizing chamber after the heat-sterilization of the food;
a second steam discharging part for discharging some of the steam in the heat-sterilizing chamber during the heat-sterilization of the food;
an air discharging part for discharging air in the inside of the heat-sterilizing chamber; and
a sealing cover supported movably along a parallel line between the first opening and second opening of the opening and closing part, wherein the sealing cover seals with the second opening of the opening and closing part solely by absorption force of the air to make the inside of the heat-sterilizing chamber in a sealed state when the air in the inside of the heat-sterilizing chamber is discharged through the air discharging part and wherein the sealing cover seals with the first opening of the opening and closing part solely by a pressure of the steam to make the opening and closing part and the inside of the heat-sterilizing chamber in a sealed state when the steam is supplied from the steam supplying part to the inside of the heat-sterilizing chamber and wherein the sealing cover does not include an external driving force member providing for parallel movement between a sealed state with the first opening and a sealed state with the second opening, and wherein the opening and closing part is located inside of the food sterilization apparatus and provides for the sealing cover to come into sealed engagement with the first opening and second opening of the opening and closing part from the inside of the opening and closing part.

2. The apparatus of claim 1, wherein the heat-sterilizing chamber comprises a generally can shaped sealing container for receiving the food;
the opening and closing part is provided with a first opening and closing part having the first opening and the second opening that is placed at one longitudinal end of the sealing container and a second opening and closing part having the first opening and the second opening that is placed at the other longitudinal end of the sealing container; and
the food is introduced into the sealed container through the first opening and the second opening of the first opening and closing part and is taken out of the sealed container through the first opening and the second opening of the second opening and closing part.

3. The apparatus of claim 2, wherein the second steam discharging part is placed in lower portions of the first opening and closing part and the second opening and closing part.

4. The apparatus of claim 1, wherein:
the sealing cover is supported by a support shaft which passes through the opening and closing part so that the sealing cover can be pivoted and parallelly moved inside of the opening and closing part, and
one end of the support shaft is coupled with the sealing cover in a position which is eccentric from the center of the sealing cover.

5. The apparatus of claim 1, further comprising a sealing member arranged in a position where the sealing cover and the second opening of the opening and closing part are in close contact with each other.

6. The apparatus of claim 5, further comprising a sealing member arranged in a position where the sealing cover and the first opening of the opening and closing part are in close contact with each other.

7. A food sterilization apparatus, comprising:
a heat-sterilizing chamber for heat-sterilizing a food;
an opening and closing part having a first opening and a second opening for passing the food there through;
a steam supplying part of supplying steam inside of the heat-sterilizing chamber;
a first steam discharging part for discharging the steam from the inside of the heat sterilizing chamber after the heat-sterilization of the food;
a second steam discharging part for discharging some of the steam in the heat-sterilizing chamber during the heat-sterilization of the food
an air discharging part for discharging air in the inside of the heat-sterilizing chamber; and
a sealing cover supported movable with respect to the first opening and second opening of the opening and closing part, wherein the sealing cover comes into close contact with the second opening of the opening and closing part by absorption force of the air to make the inside of the heat-sterilizing chamber in a sealed state when the air in the inside of the heat-sterilizing chamber is discharged through the air discharging part and wherein the sealing cover comes into close contact with the first opening of the opening and closing part by a pressure of the steam to make the opening and closing part and the inside of the heat-sterilizing chamber in a sealed state when the steam is supplied from the steam supplying part to the inside of the heat-sterilizing chamber wherein;
the opening and closing part is located inside of the food sterilization apparatus;
wherein the heat-sterilizing chamber comprises a generally can shaped sealing container for receiving the food, the opening and closing part is provided with a first opening and closing part having the first opening and the second opening placed at one longitudinal end of the sealing container and a second opening and closing part having the first opening and the second opening placed at the other longitudinal end of the sealing container; and the food is introduced into the sealed container through the first opening and the second opening of the first opening and closing part and is taken out of the sealed container through the first opening and the second opening of the second opening and closing part; and
wherein the second steam discharging part is placed in lower portions of the first opening and closing part and the second opening and closing part.

* * * * *